United States Patent [19]
Combes et al.

[11] Patent Number: 5,837,629
[45] Date of Patent: *Nov. 17, 1998

[54] GLASS COMPOSITION FOR MAKING GLAZING

[75] Inventors: Jean-Marie Combes, Paris; Pedro Pablo Mazon-Ramos, Oviedo, both of France

[73] Assignee: Saint-Gobain Vitrage, Courbevoie, France

[ * ] Notice: This patent issued on a continued prosecution application filed under 37 CFR 1.53(d), and is subject to the twenty year patent term provisions of 35 U.S.C. 154(a)(2).

[21] Appl. No.: 596,372

[22] PCT Filed: Jun. 22, 1995

[86] PCT No.: PCT/FR95/00828

§ 371 Date: Jun. 27, 1996

§ 102(e) Date: Jun. 27, 1996

[87] PCT Pub. No.: WO96/00194

PCT Pub. Date: Jan. 4, 1996

[30] Foreign Application Priority Data

Jun. 23, 1994 [FR] France .................... 94 07724

[51] Int. Cl.⁶ .................................................. C03C 3/087
[52] U.S. Cl. ................................. 501/70; 501/71; 501/57
[58] Field of Search .................. 501/57, 70, 71, 501/72

[56] References Cited

U.S. PATENT DOCUMENTS

| | | |
|---|---|---|
| 2,902,377 | 9/1959 | Duncan et al. . |
| 3,294,556 | 12/1966 | Harrington et al. . |
| 3,723,142 | 3/1973 | Kato et al. . |
| 3,837,831 | 9/1974 | Moore . |
| 5,013,487 | 5/1991 | Cheng ........................ 501/70 |
| 5,077,133 | 12/1991 | Cheng et al. ............... 501/70 |
| 5,240,886 | 8/1993 | Gulotta et al. .............. 501/70 |
| 5,318,931 | 6/1994 | Nakaguchi et al. ........ 501/70 |
| 5,352,640 | 10/1994 | Combes et al. . |
| 5,372,977 | 12/1994 | Mazon-Ramos et al. . |
| 5,385,872 | 1/1995 | Gulotta et al. ............. 501/71 |
| 5,478,783 | 12/1995 | Higby et al. ............... 501/27 |
| 5,545,596 | 8/1996 | Alvarez-Casariego et al. .......... 501/71 |
| 5,565,388 | 10/1996 | Krumweide et al. ...... 501/70 |
| 5,582,455 | 12/1996 | Casariego et al. ........ 296/146.2 |
| 5,593,929 | 1/1997 | Krumweide et al. ...... 501/70 |

FOREIGN PATENT DOCUMENTS

| | | |
|---|---|---|
| 452207 | 10/1991 | European Pat. Off. . |
| 469446 | 2/1992 | European Pat. Off. . |
| 536049 | 4/1993 | European Pat. Off. . |
| 561337 | 9/1993 | European Pat. Off. . |
| 25672587 | 8/1992 | France . |
| 2699526 | 6/1994 | France . |
| 0215546 | 10/1985 | Japan . |
| 1151521 | 4/1985 | U.S.S.R. . |
| 91/07356 | 5/1991 | WIPO . |

*Primary Examiner*—Karl Group
*Attorney, Agent, or Firm*—Oblon, Spivak, McClelland, Maier & Neustadt, P.C.

[57] ABSTRACT

A silica-soda-lime glass composition suitable for making glazing. Said glass consists of 69–75 wt % $SiO_2$, 0–3 wt % $Al_2O_3$, 0–5 wt % $B_2O_3$, 2–10 wt % CaO, 0–2 wt % MgO, 9–17 wt % $Na_2O$, 0–8 wt % $K_2O$, 0.2–4 wt % $Fe_2O_3$ (total iron), and 0–0.45 wt % Se, CoO, $Cr_2O_3$, NiO, CuO. The amount of tinting agents other than iron is at least 0.0002 wt % when the $Fe_2O_3$ content is 1.5 wt % or less. The composition may also contain fluorine; zinc, zirconium, cerium and titanium oxides; and less than 4 wt % barium oxide; while the sum of the percentages of alkaline earth oxides is not above 10 wt %.

16 Claims, No Drawings

GLASS COMPOSITION FOR MAKING GLAZING

BACKGROUND OF THE INVENTION

1. Field of the Invention

The present invention relates to a composition of silica-soda-calcium glass apt for the making of glass windows notably susceptible of being used in the automobile industry or in the architectural field.

2. Description of the Background

The glass windows used in these fields present characteristics of transmission very much different in regard to effects much sought after.

One of the effects actively sought is the greatest reduction possible of the energetic transmission of glass windows, i.e., its transmission in the visible be weak or raised. This effect is obtained by increasing the absorption of infrared radiations of glass of which it is constituted. The study of this effect will often go in pair with the study of the other effects as a weak transmission of ultraviolet radiations and a particular coloring.

If the constituents susceptible to obtain such effects are generally known, the study of a combination of particular characteristics, for example, the luminous transmission factors and the energetic transmission presenting a predetermined relation, associated to a domain of a well defined wavelength and at a specific gravity, is difficult.

Therefore, to maintain a luminous transmission raised in the visible part of the spectrum by all absorbing the most possible, i.e., the rest of the solar energy, it is known to introduce iron in the composition of glass.

At the same time, it is present in the glass in the form of ferric oxide ($Fe_2O_3$) and ferrous oxide (FeO).

The presence of $Fe_2O_3$ permits the absorption of UV radiations and those which possess short wavelengths in the visible part of the spectrum. On the contrary, the presence of FeO permits the absorption close to IR radiations and those corresponding to long wavelengths in the visible region.

If the increase of iron content under two of its oxide forms accentuates the absorption of radiations at two ends of the visible spectrum, this effect is obtained at the expense of the luminous transmission.

Till this day, different solutions were proposed to use in a better way, the aptitude of iron oxides to absorb the radiations by conserving nevertheless the biggest luminous transmission possible. The preferred solutions to absorption of radiation belonging closely to infrared may consist in modifying in an important manner, the glass composition or else to manufacture much reduced glasses whose composition is relatively classic.

The first category of solutions may be illustrated by requesting for the patent JP-60-215546, the second category by the EP-297404.

According to the Japanese patent, the glasses which present the characteristics of transmission and of absorption much sought after, contain at least 4% in weight of BaO. This oxide, introduced in sufficient quantity has the effect of shifting the absorption band due to FeO close to infrared towards the longer wavelengths. This effect may be accentuated by the introduction of $K_2O$ in these glasses.

The introduction of BaO according to the contents relatively raised in these glasses has in the meantime effects which are negative: the non-negligible increase of cost of the composition, the diminution of hydrolytic resistance of the glass. A strong percentage of BaO can accentuate the phenomenon of devitrification and render the obtaining of homogenous glass more difficult.

The glasses described in the European patent mentioned above are traditional silica-soda-calcium glasses whose total iron content, expressed under the form of $Fe_2O_3$ is understood between 0.45 and 0.65%. These glasses are made in the conditions such that less than 35% and preferably at least 50% of total iron is in the form of FeO. The increase of the FeO content thus obtained is to accentuate the absorption of glasses in the infrared and to reduce the $T_E$ factor. However, when a glass is made in the presence of sulphur in the reduced conditions, this last one takes on an amber color due to the formation of chromophores which results from the reaction between sulphur and ferrous iron. To avoid this, it is therefore necessary to remove the sulphates in the vitrifiable mixture and, as the content of sulphur in glass is never nil, to watch at what percentage of ferrous iron remains weak which leads to rigorously limiting the total iron content. The present invention relates to a glass composition, capable of being coated on the surface by a metal bath according to the technique of floating glass, for a global luminous transmission factor under illuminant $A(TL_A)$ data, a global energetic transmission factor ($T_E$) inferior to that of the known glasses presenting an identical $TL_A$ factor.

SUMMARY OF THE INVENTION

The present invention forms a composition of glass capable to permit the obtaining of glazing, presenting a coloration relatively neutral, or variant from blue to green by basing all the intermediary grades.

The present invention forms a composition of glass capable of being made in the oxide reduction condition usually observed for a standard floating glass.

These ends are attained by a composition of silica-soda-calcium glass which comprises of the following constituents according to the contents expressed in weight percentages, defined by the following limits:

| | |
|---|---|
| $SiO_2$ | 69 to 75% |
| $Al_2O_3$ | 0 to 3% |
| $B_2O_3$ | 0 to 5% |
| CaO | 2 to 10% |
| MgO | 0 to 2% |
| $Na_2O$ | 9 to 17% |
| $K_2O$ | 0 to 8% |
| $Fe_2O_3$ (total iron) | 0.2 to 4% |
| Se, CoO, $Cr_2O_3$, NiO, CuO | 0 to 0.45% |

The coloring agent content other than iron being at least equal to 0.0002% whereas the $Fe_2O_3$ content is equal to or less than 1.5%, this composition being susceptible to equally contain fluorine, oxides of zinc, zirconium, cerium and titanium and less than 4% of barium oxide, the sum of earth alkaline oxides percentage remaining equal or inferior to 10%.

In the glasses according to the invention, the total content of coloring agents, Se, CoO, $Cr_2O_3$, NiO expressed in weight percentage vary from 0 to 0.15%.

The glasses according to the invention may equally contain impurities resulting either from chosen vitrifiable raw materials or from recycled calcine in the melting furnace. These impurities may be constituted in low quantities by coloring agents such as manganese or vanadium compounds.

The content and the nature of each constituent entering in the composition of glasses according to the invention covered hereafter, permit to obtain these glasses which by presenting all the required properties to manufacture glass windows from the sheets cut in floated glass strips, characterized by a maximum shifting of the absorption band due to FeO towards the long wavelengths. The glasses according to the invention are characterized equally by a wavelength dominant under illuminant C equal to or less than around 560 nanometers.

DETAILED DESCRIPTION OF THE INVENTION

In the glasses according to the invention, the silica is maintained within a relatively narrow limit for the following reason, around above 75% the viscosity of the glass and its aptitude for devitrification increases strongly which renders its fusion and its casting on tin bath difficult below 69%, the hydrolytic resistance of the glass decreases very rapidly and the transmission in the visible is equally reduced.

This reduction of hydrolytic resistance of the glass may be compensated at least in part by the introduction of $Al_2O_3$, but as this oxide contributes to the increase of its viscosity and in the reduction of the transmission in the visible, it can only be used in very limited quantities.

The alkaline oxides $Na_2O$ and $K_2O$ permit to facilitate the fusion of glass and to adjust its viscosity at raised temperatures in order to maintain it close to that of a standard glass. $K_2O$ may be used till around 8%. Beyond this percentage, the increase of cost of the composition becomes an economical handicap. Besides, the $K_2O$ percentage cannot be increased, for essentially, due to the detriment of $Na_2O$, it can contribute to the increase of the viscosity. However, in determined conditions, the presence of $K_2O$ permits to increase the absorption of glass in the infrared. The sum of the contents of $Na_2O$ and $K_2O$ expressed in weight percentages is preferably equal to or greater than 15%.

The alkaline-earth oxides play a determining role in obtaining the glass properties of the present invention.

It was in fact discovered that the limitation of the MgO content at a weight percentage of 2% and preferably less than 1%, its likewise suppression in the glasses of the invention has notably the effect to shift the absorption band due to FeO towards the long wavelengths and thus permit to increase their capacity of absorption in the infrared without damaging the transmission in the visible. The suppression of MgO which plays an important role on the viscosity may be compensated at least in part by the increase of $Na_2O$. Thus, when the content in MgO is practically nil, the sum of contents in $Na_2O$ and $K_2O$ expressed in weight percentages is equal to or greater than 15%.

CaO must be limited to 10%; beyond this the aptitude of the glass at devitrification increases very rapidly.

BaO which permits to increase the luminous transmission of certain glasses may be added in the compositions according to the invention in contents less than 4%. In fact, BaO has an influence which is more weak than MgO and CaO on the viscosity of the glass. Within the invention framework, the increase of the BaO is essentially done by the detriment of alkaline oxides of MgO and above all of CaO. An important increase of the BaO thus contributes to the increase of the viscosity of the glass notably at low temperatures. What is more, the introduction of a raised percentage of BaO sensibly increase the cost of the composition and has the tendency to reduce the hydrolytic resistance of the glass. To these considerations, it must be added that contrary to what this Japanese document previously indicated, the introduction of a low percentage of BaO in the glass containing less and preferably no MgO permits to increase the absorption of infrared radiations. When the glasses of the invention contain barium oxide, the percentage of this oxide is preferably understood between 0.5 and 3.5% by weight.

Besides in respect of limits defined previously for the variation of the content of each alkaline-earth-oxide, it is imperative to list the sum of the MgO, CaO and BaO percentages at an equal value or inferior to 10% to obtain the properties of transmission sought after.

The glasses according to the invention contain equally iron oxides whose contents are globally expressed under the $Fe_2O_3$ form, (total iron). The content of total iron just as the content of FeO of glass according to the invention may vary in large proportions in regard to the properties sought after for the said glasses.

The glasses according to the invention may equally contain fluorine, preferably between 0.5 and 2% by weight. Besides its well known action on the fusion and the viscosity of the glass, this constituent had a specific effect on the infrared radiation absorption, an effect which adds to the effect produced by the MgO suppression and the introduction of $K_2O$ and BaO. This effect translates by a light shifting of the absorption band at maximum in the infrared but moreover by straightening of the said band at the extremity of the closely visible infrared domain.

The glasses according to the invention may also contain zinc oxide. This oxide permits a reduction of the viscosity of the glass if necessary and contributes to increase the hydrolytic resistance of the glass and to reduce its aptitude for devitrification. It is the reason for which ZnO is introduced preferably in the glasses according to the invention containing a raised percentage of silica and/or not containing alumina. The zinc oxide may be advantageously added in the vitrifiable mixture which will be used to make a reduced glass. This oxide permits to avoid the appearance of the amber color due to the formation of iron sulphide which may be produced in this type of glasses. Thus, the zinc oxide may be introduced in the glasses according to the invention at the rate of at least 0.05% when the reported $FeO/Fe_2O_3$ (total) is equal to or greater than around 0.4%. In order not to increase the cost of the composition excessively, the content of ZnO does not exceed around 3% by weight.

The glasses according to the invention may equally contain zirconium oxide. This oxide permits a stabilization of the glass and to amelioration of the chemical resistance of the glass, particularly its hydrolytic resistance. This oxide is introduced preferably in the glasses according to the invention containing few or no alumina in the contents which may attain 1.5% by weight.

The glasses according to the invention may equally contain cerium oxide in order to increase the absorption of ultra-violet radiations. The glasses according to the invention may comprise up to 1.5% and preferably 0.3 to 0.8% by weight in $Ce_2O_3$.

The glasses according to the present invention may also contain titanium oxide, the content of this oxide attaining 1% by weight. This oxide as $Ce_2O_3$ permits an increase in the absorption of ultraviolet radiations. When these two oxides are present in the glasses according to the invention, the introduction of $TiO_2$ permits a reduction in the content of $Ce_2O_3$ which is a costly oxide. Generally, the sum of these two oxides do not exceed 1.2% by weight.

The glasses according to the invention may equally contain up to 1% of other constituents brought by the impurities of vitrifiable raw materials and/or as a result of the introduction of calcine in the vitrifiable mixture and/or coming from the use of refining agents ($SO_3$, Cl, $Sb_2O_3$, $As_2O_3$).

The glasses according to the invention may be made in the conditions which permit to attain the degree of desired oxide reduction. Thus, the glasses according to the invention may be made by using the known refixing agents such as the sulphates, their redox being less than 0.40 and generally comprise between 0.2 and 0.35. The glasses according to the invention less rich in iron may also be made under the conditions described, for example, by the patent EP-B-297 404 and present a redox greater than 0.4 or 0.5, the redox of glasses according to the invention remains however less than 0.8.

The content and nature of each of the constituents entering in the composition of the glasses according to the invention, principally the alkaline-earth oxides, permit to obtain more absorbent glasses close to infrared. This property is due to a shifting towards the long wavelengths at maximum of the FeO absorption band in this spectral region. This shifting often accompanies an increase of intensity of this absorption band and/or its expansion. This increase of the absorption in the infrared does not lead to as much a reduction, even low, of the transmission in the visible, on the contrary, it is accompanied by an increase of the said transmission.

In the composition of glasses according to the invention, the coloring agents other than the iron are introduced single or in combination according to the weight contents which preferably remain less than the following limits:
Se<0.008%
CoO<0.04%
$Cr_2O_3$<0.1%
NiO<0.07%
CuO<0.3%

The advantages of the glasses according to the invention will be better perceived through the glasses described in the chart in annexure and which are covered hereafter.

These glasses apart from coloring agents have compositions very near to the medium A composition indicated hereafter, expressed in weight percentages. A known glass reference 1 given for comparison presents, apart from colouring agents, the composition B described hereafter, expressed in weight percentages

|  | A | B |
| --- | --- | --- |
| $SiO_2$ | 72.60 | 70.86% |
| $Al_2O_3$ | 0.50 | 0.65% |
| CaO | 8.70 | 9.5% |
| MgO | 0.03 | 4.25% |
| $Na_2O$ | 16.30 | 13.9% |
| $K_2O$ | 0.20 | 0.2% |
| $SO_3$ | 0.15 | 0.27% |

These glasses were made in varied oxide reduction conditions. The glasses referred to from 13 to 17 are theoretical compositions.

The global luminous transmission factors under A ($TL_A$) illuminant and ($T_E$) in global energetic transmission just as the transmission in the infrared ($T_{IR}$) were measured according to the PARRY MOON MASS 2 method; the transmission in the ultraviolet was determined according or the method defined by the ISO 9050 norm. The values of these different factors of transmission as also those of the purity of excitation under C illuminant (Pc) correspond to a thickness of 3.85 millimeters, except the examples 3, 4 for which the values indicated correspond to a thickness of 3.15 millimeters.

These different examples show that in the large range of colouring agents of the glasses according to the invention presents a factor of global energetic transmission ($T_E$) less than the global luminous transmission factor ($TL_A$) that the value of this last one be raised or lowered. This good selectivity of glasses according to the invention is due to in great part to the shifting of the absorption band at maximum, characteristic of FeO, towards the long wavelengths. The examples illustrating the invention show that this maximum ($\lambda$ FeO) is generally greater than 1090 nanometers and very often equal to or less than 1150 nanometers, so that the magnesia glasses of ancient art present a maximum of this band very neatly less than these values.

The glasses according to the invention are compatible with habitual manufacturing techniques of flat glasses under reserve, for certain glasses, to be made in the furnace equipped with electrodes. The thickness of the glass riband obtained by coating of the glass in fusion in a tin bath may vary between 0.8 to 10 millimeters.

The glazings obtained by the cutting of the glass riband may undergo subsequently a bombing operation, notably when it must rise on an automobile vehicle.

To make wind-screens or lateral glass windows, the glass chosen is initially cut in glass riband whose thickness generally varies between 3 to 5 millimeters. Under these thicknesses, the glasses according to the invention assure a good thermic comfort. Following the example of other glazings, the glass windows obtained from the glasses according to the invention may be subjected preliminarily to superficial treatments or be associated, for example, to an organic coating such as a film base of polyurethanes with antilacerant properties or a film assuring the clamping in case of breaking, it may be locally covered with an enamel coating.

The glasses according to the invention may be covered by at least one coat of metallic oxide obtained by chemical deposit at high temperatures according to the pyrolysis technique or by chemical deposit in vapour phase (CVD) or by deposit under vacuum.

|  | EX. 1 | EX. 2 | EX. 3 | EX. 4 | EX. 5 | EX. 6 |
| --- | --- | --- | --- | --- | --- | --- |
| $Fe_2O_3$ | 0.32 | 0.37 | 0.68 | 0.79 | 0.69 | 1.51 |
| FeO | 0.072 | 0.10 | 0.183 | 0.239 | 0.21 | 0.38 |
| CoO | 0.0035 | 0.003 | 0.0038 | 0.0026 | 0.0073 | 0.0039 |
| $Cr_2O_3$ | 0.0005 | — | — | — | — | — |
| Se | 0.0019 | 0.0002 | — | — | 0.0005 | — |
| $Ce_2O_3$ | — | — | 0.55 | — | — | — |
| $TL_A$(%) | 61.8 | 73.6 | 71 | 71 | 53.2 | 52.2 |
| $T_E$(%) | 59.3 | 62.1 | 52.3 | 46.7 | 39.8 | 28.1 |

-continued

| | | | | | | |
|---|---|---|---|---|---|---|
| $T_{IR}(\%)$ | 57.4 | 49.8 | 34.4 | 24 | 24.4 | 7.6 |
| $T_{UV}(\%)$ | 22.9 | 41.3 | 20.7 | 31 | 25.6 | 10.6 |
| $\lambda_D(nm)$ | 581 | 485.3 | 487.5 | 488 | 483 | 481.6 |
| $P_C(\%)$ | 5.44 | 3.3 | 6 | 6.8 | 9.4 | 9.5 |
| $\lambda_{FeO}^{(nm)}$ | 1070 | 1180 | 1130 | 1130 | 1170 | 1135 |

| | EX. 7 | EX. 8 | EX. 9 | EX. 10 | EX. 11 | EX. 12 |
|---|---|---|---|---|---|---|
| $Fe_2O_3$ | 1.69 | 1.89 | 1.95 | 2.41 | 3.07 | 3.50 |
| FeO | 0.21 | 0.46 | 0.48 | 0.56 | 0.83 | 0.78 |
| CoO | 0.0073 | 0.0288 | 0.0252 | 0.0089 | 0.0254 | 0.0282 |
| Se | 0.0005 | 0.0043 | 0.0040 | — | — | — |
| $TL_A(\%)$ | 28.7 | 8.3 | 10.1 | 32.0 | 11.6 | 8.6 |
| $T_E(\%)$ | 17.4 | 7.1 | 7.7 | 15.9 | 6.4 | 4.7 |
| $T_{IR}(\%)$ | 7.0 | 4 | 4.4 | 2.8 | 1 | 0.8 |
| $T_{UV}(\%)$ | 4.9 | 1.4 | 1.6 | 2.5 | 0.7 | 0.14 |
| $\lambda_D(nm)$ | 500 | 524.6 | 555 | 493 | 484.6 | 487.3 |
| $P_C(\%)$ | 3.5 | 0.5 | 2.1 | 12.3 | 33.2 | 28.2 |
| $\lambda_{FeO}^{(nm)}$ | 1150 | 1175 | 1155 | 1140 | 1105 | 1095 |

| | EX. 13 | EX. 14 | EX. 15 | EX. 16 | EX. 17 | EX. 18 |
|---|---|---|---|---|---|---|
| $Fe_2O_3$ | 1.51 | 1.51 | 0.50 | 0.50 | 1.51 | 0.56 |
| FeO | 0.38 | 0.38 | 0.24 | 0.24 | 0.38 | 0.167 |
| CoO | 0.0039 | 0.0039 | — | — | 0.0039 | 0.0051 |
| NiO | 0.03 | 0.05 | 0.02 | — | — | — |
| F | — | — | 0.9 | — | — | — |
| $Cr_2O_3$ | — | — | — | 0.05 | 0.09 | — |
| CuO | — | — | — | — | — | 0.15 |
| $TL_A(\%)$ | 45 | 40 | 70 | 71.5 | 45.5 | 72.9 |
| $T_E(\%)$ | 23.9 | 21.6 | 42.8 | 44 | 24 | 52 |
| $T_{IR}(\%)$ | 7.3 | 7.0 | 19.2 | 19.5 | 7.5 | 38 |
| $T_{UV}(\%)$ | 10.5 | 10.5 | 43.9 | 44.0 | 10.6 | 33 |
| $\lambda_D(nm)$ | 513 | 547 | 516 | 507 | 512 | 488 |
| $P_C(\%)$ | 4.17 | 7.96 | 2.15 | 4.56 | 7.82 | 6.9 |
| $\lambda_{FeO}^{(nm)}$ | 1135 | 1135 | 1180 | 1180 | 1135 | 1130 |

We claim:

1. A glass composition which consists essentially of the following constituents expressed in weight percentage, defined by the following limits:

| | |
|---|---|
| $SiO_2$ | 69 to 75% |
| $Al_2O_3$ | 0 to 3% |
| $B_2O_3$ | 0 to 5% |
| CaO | 2 to 10% |
| MgO | 0 to 2% |
| $Na_2O$ | 9 to 17% |
| $K_2O$ | 0 to 8% |
| $Fe_2O_3$ (total iron) | 0.2 to 4%, and as an additional colouring agent, at least one of |
| Se, CoO, $Cr_2O_3$, NiO, and CuO | 0 to 0.45% | the additional colouring agent content being at least equal to 0.0002% when the $Fe_2O_3$ content is equal to or less than to 1.5%, wherein said composition may contain fluorine, zinc oxide, zirconium oxide, cerium oxide, titanium oxide and less than 4% of barium oxide, the sum of alkaline earth metal oxide percentages being equal or less than 10%.

2. The glass composition as claimed in claim 1 wherein the total content of additional colouring agent is in a range of 0 to 0.15%.

3. The glass composition as claimed in claim 1 wherein the content of MgO is less than 1%.

4. The glass composition as claimed in claim 1 wherein the total content of $Na_2O$ and $K_2O$ is greater than about 15%.

5. The glass composition as claimed in claim 1 wherein said glass composition comprises 0.5 to 3.5% by weight of BaO.

6. The glass composition as claimed in claim 1 wherein said glass composition comprises of 0.5 to 2% by weight of fluorine.

7. The glass composition as claimed in claim 1 wherein said glass composition comprises 0.05 to 3% by weight of ZnO.

8. The glass composition as claimed in claim 1 wherein said glass composition contains 0 to 1.5% by weight of $ZrO_2$.

9. The glass composition as claimed in claim 1 wherein said glass composition contains 0 to 1.5% by weight of $Ce_2O_3$.

10. The glass composition as claimed in claim 1 wherein said glass composition comprises upto 1% by weight of $TiO_2$.

11. The glass composition as claimed in claim 1, wherein said glass composition simultaneously comprises cerium oxide and titanium oxide, wherein the sum $Ce_2O_3+TiO_2$ is equal to or less than 1.2% and above 0% by weight.

12. The glass composition as claimed in claim 1 wherein said glass composition comprises FeO in a proportion such that a ratio of $FeO/Fe_2O_3$ is less than 0.8.

13. The glass composition as claimed in claim 1 wherein said additional colouring agents are present according to the weight contents defined by the following limits:

Se<0.008%
CoO<0.04%
$Cr_2O_3$<0.1%
NiO<0.07%
CuO<0.3%.

14. The glass composition as claimed in claim 1 wherein said glass composition has a dominant wavelength sub-illuminating C inferior to 560 manometers.

15. Glass window comprising a sheet of glass wherein said sheet has a chemical composition as claimed in claim 1, said sheet having a thickness of between 0.8 to 10 millimeters.

16. The glass composition as claimed in claim 1 wherein the content of MgO is 0.

* * * * *

UNITED STATES PATENT AND TRADEMARK OFFICE
CERTIFICATE OF CORRECTION

PATENT NO. : 5,837,629
DATED : November 17, 1998
INVENTOR(S) : Jean-Marie COMBES et al.

It is certified that error appears in the above-identified patent and that said Letters Patent is hereby corrected as shown below:

On the title page, item [75], should read:

--Jean-Marie Combes, Paris, France; Pedro Pablo Mazon-Ramos, Oviedo, Spain.--

Signed and Sealed this

Twentieth Day of July, 1999

Attest:

Q. TODD DICKINSON

*Attesting Officer*     *Acting Commissioner of Patents and Trademarks*

UNITED STATES PATENT AND TRADEMARK OFFICE
CERTIFICATE OF CORRECTION

PATENT NO. : 5,837,629

DATED : November 17, 1998

INVENTOR(S): Jean-Marie COMBES, et al.

It is certified that an error appears in the above-identified patent and that said Letters Patent is hereby corrected as shown below:

Column 8, line 41, "comprises upto" should read --contains 0 to--.

Signed and Sealed this

Second Day of January, 2001

Attest:

Q. TODD DICKINSON

Attesting Officer

Commissioner of Patents and Trademarks